US011480657B2

(12) United States Patent
Wang et al.

(10) Patent No.: US 11,480,657 B2
(45) Date of Patent: Oct. 25, 2022

(54) LASER DETECTION AND RANGING DEVICE COMPRISING A SIGNAL TRANSMISSION MODULE, A POWER TRANSMISSION MODULE, A TIMING MODULE AND A MECHANICAL ROTATING PART TO DRIVE A RANGE FINDER

(71) Applicant: LEISHEN INTELLIGENT SYSTEM CO. LTD., Shenzhen (CN)

(72) Inventors: Yong Wang, Shenzhen (CN); Peihua Duan, Shenzhen (CN); Xiaobo Hu, Shenzhen (CN)

(73) Assignee: LEISHEN INTELLIGENT SYSTEM CO. LTD., Shenzhen (CN)

( * ) Notice: Subject to any disclaimer, the term of this patent is extended or adjusted under 35 U.S.C. 154(b) by 797 days.

(21) Appl. No.: 16/447,950

(22) Filed: Jun. 20, 2019

(65) Prior Publication Data

US 2019/0317192 A1 Oct. 17, 2019

Related U.S. Application Data

(63) Continuation-in-part of application No. PCT/CN2017/082710, filed on May 2, 2017.

(30) Foreign Application Priority Data

Dec. 22, 2016 (CN) .......................... 201611200006.9

(51) Int. Cl.
*G01S 7/48* (2006.01)
*G01S 7/481* (2006.01)
(Continued)

(52) U.S. Cl.
CPC ............. *G01S 7/4811* (2013.01); *G01S 7/484* (2013.01); *G01S 7/4865* (2013.01); *G01S 17/04* (2020.01)

(58) Field of Classification Search
CPC .......... G01S 17/02; G01S 17/04; G01S 17/06; G01S 17/10; G01S 17/66; G01S 17/88;
(Continued)

(56) References Cited

U.S. PATENT DOCUMENTS 9,389,307 B2   7/2016  Kim
9,983,590 B2 * 5/2018  Templeton ........... G05D 1/0231
                        (Continued)

FOREIGN PATENT DOCUMENTS

CN         105785383      7/2016
CN         105807283      7/2016
                 (Continued)

OTHER PUBLICATIONS

"Search Report of Europe Counterpart Application", dated Apr. 23, 2020, p. 1-p. 12.
(Continued)

*Primary Examiner* — Que Tan Le
(74) *Attorney, Agent, or Firm* — JCIP Global Inc.

(57) ABSTRACT

A LADAR device, including: a rangefinder; a signal transmission module; a power transmission module; a mechanical rotating part; a housing; a signal processing board; and a timing module. The signal transmission module includes at least one optical communication transmitter and one optical communication receiver. The power transmission module includes coupled magnet rings and communicates with the signal transmission module through electromagnetic induction to achieve wireless power transmission. The mechanical rotating part is adapted to drive the rangefinder to rotate axially in 360 degrees. The rangefinder is disposed on the housing, and includes a laser, an emitting lens assembly, a receiving sensor, and a receiving lens. The emitting lens assembly includes a first accommodation space and the laser is disposed in the first accommodation space. The receiving
(Continued)

lens includes a second accommodation space and the receiving sensor is disposed in the second accommodation space.

6 Claims, 4 Drawing Sheets

(51) Int. Cl.
    *G01S 7/484*     (2006.01)
    *G01S 7/4865*     (2020.01)
    *G01S 17/04*     (2020.01)

(58) Field of Classification Search
    CPC ............ G01S 17/42; G01S 7/48; G01S 17/86; G05D 1/00; G05D 1/02
    USPC ...................................... 250/221, 239, 214 R
    See application file for complete search history.

(56) References Cited

U.S. PATENT DOCUMENTS

| | | |
|---|---|---|
| 2008/0243429 A1 | 10/2008 | Yoshino et al. |
| 2010/0007870 A1 | 1/2010 | Haberer et al. |
| 2014/0198308 A1 | 7/2014 | Kim |

FOREIGN PATENT DOCUMENTS

| | | |
|---|---|---|
| CN | 205484806 | 8/2016 |
| CN | 205608183 | 9/2016 |
| CN | 106019293 | 10/2016 |
| CN | 205643711 | 10/2016 |
| CN | 106597466 | 4/2017 |
| CN | 206400103 | 8/2017 |
| JP | 3178159 | 9/2012 |
| JP | 2015081921 | 4/2015 |

OTHER PUBLICATIONS

"Office Action of Japan Counterpart Application", dated Jun. 2, 2020, p. 1-p. 3.

"Office Action of Korea Counterpart Application", dated Feb. 24, 2020, p. 1-p. 7.

"International Search Report (Form PCT/ISA/210)" of PCT/CN2017/082710, dated Sep. 22, 2017, with English translation thereof, pp. 1-4.

"Search Report of China Counterpart Application", dated Oct. 27, 2017, p. 1-p. 2.

\* cited by examiner

LASER DETECTION AND RANGING DEVICE COMPRISING A SIGNAL TRANSMISSION MODULE, A POWER TRANSMISSION MODULE, A TIMING MODULE AND A MECHANICAL ROTATING PART TO DRIVE A RANGE FINDER

CROSS-REFERENCE TO RELATED APPLICATIONS

This application is a continuation-in-part of International Patent Application No. PCT/CN2017/082710 with an international filing date of May 2, 2017, designating the United States, now pending, and further claims foreign priority benefits to Chinese Patent Application No. 201611200006.9 filed Dec. 22, 2016. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to a laser detection and ranging (LADAR) device.

FIG. 1 shows a conventional LADAR device 200. The laser light generated by the laser 211 is collimated by the collimator 204 fixed on the aspheric lens 205 to form a narrow beam. The narrow beam is reflected by the reflector 208, guided by the light guide 210, filtered by the filter 209, and then projected to the surrounding environment. The motor 201 near the encoder 203 drives the reflector 208 and the light guide 210 to rotate. The rotation is controlled by the photoelectric switch 207. The returned laser light penetrates the filter 209 and is received by the receiving unit 212.

The power supply and speed control signals of the motor are transmitted through the wires in the wiring channel 202. The laser driving signal is sent out by the signal processing unit 206. Because of the interruption of the wiring channel 202, the laser light cannot scan the surrounding environment in 360 degrees. The actual scanning angle is generally less than or equal to 270°. In addition, the rotating part of the LADAR device is electrically connected to the fixed base through a conductive slip ring, and the electrical energy and the signals are exchanged through the frictional parts inside the slip ring. Because of this, the LADAR device is not as durable as it could be.

SUMMARY

Disclosed is a LADAR device that can scan a target object in 360 degrees.

The disclosure provides a LADAR device, comprising: a rangefinder; a signal transmission module; a power transmission module; a mechanical rotating part; a housing; a signal processing board; and a timing module.

The signal transmission module comprises at least one optical communication transmitter and one optical communication receiver corresponding to the one optical communication transmitter; the power transmission module comprises coupled magnet rings, and communicates with the signal transmission module through electromagnetic induction to achieve wireless power transmission; the mechanical rotating part is adapted to drive the rangefinder to rotate axially in 360 degrees; the rangefinder is disposed on the housing, and comprises a laser, an emitting lens assembly, a receiving sensor, and a receiving lens; the emitting lens assembly comprises a first accommodation space and the laser is disposed in the first accommodation space; the receiving lens comprises a second accommodation space and the receiving sensor is disposed in the second accommodation space; the at least one optical communication transmitter and one optical communication receiver corresponding to the one optical communication transmitter are disposed in a middle part of the housing; the mechanical rotating part comprises a built-in hollow-shaft motor; the housing comprises a first part, a second part, and a third part, and the second part is disposed between the first part and the third part; the built-in hollow-shaft motor is flexibly connected to the first part of the housing via a belt, and is adapted to drive the first part and the second part of the housing to rotate via the belt; the power transmission module comprises an upper part and a lower part; the upper part is disposed in the second part of the housing and adapts to rotate axially in 360 degrees; and the lower part is fixed on the third part of the housing; the rangefinder is a time-of-flight laser ranging module; and when in use, the signal processing board adapts to produce a pulse signal; an optical signal is transmitted from the optical communication transmitter to the optical communication receiver; the timing module adapts to receive the pulse signal as a timing start signal, receive a timing termination signal from the receiving sensor, and calculate a time of flight of the optical signal according to the timing start signal and the timing termination signal.

The signal transmission module can comprise: a first optical communication transmitter and a first optical communication receiver corresponding to the first optical communication transmitter, and a second optical communication transmitter and a second optical communication receiver corresponding to the second optical communication transmitter, to achieve a full-duplex communication mode or a half-duplex communication mode.

The emitted optical signals of the first optical communication transmitter and received optical signals of the first optical communication receiver can be in the same waveband; the emitted optical signals of the second optical communication transmitter and received optical signals of the second optical communication receiver can be in the same waveband; and the emitted optical signals of the first/second optical communication transmitter and received optical signals of the second/first optical communication receiver can be in different wavebands.

The signal transmission module can comprise one optical communication transmitter and one optical communication receiver corresponding to the one optical communication transmitter, to achieve a simplex communication mode.

The optical communication transmitter and the optical communication receiver can be diodes.

Advantages of the LADAR device as described herein are summarized as follows. The LADAR device involves no slip ring, has a relatively simple structure, relatively low wear rate, relatively long durability, and can scan a target object in 360 degrees.

DETAILED DESCRIPTION

To further illustrate, embodiments detailing a LADAR device are described below. It should be noted that the following embodiments are intended to describe and not to limit the disclosure.

Figure 1:
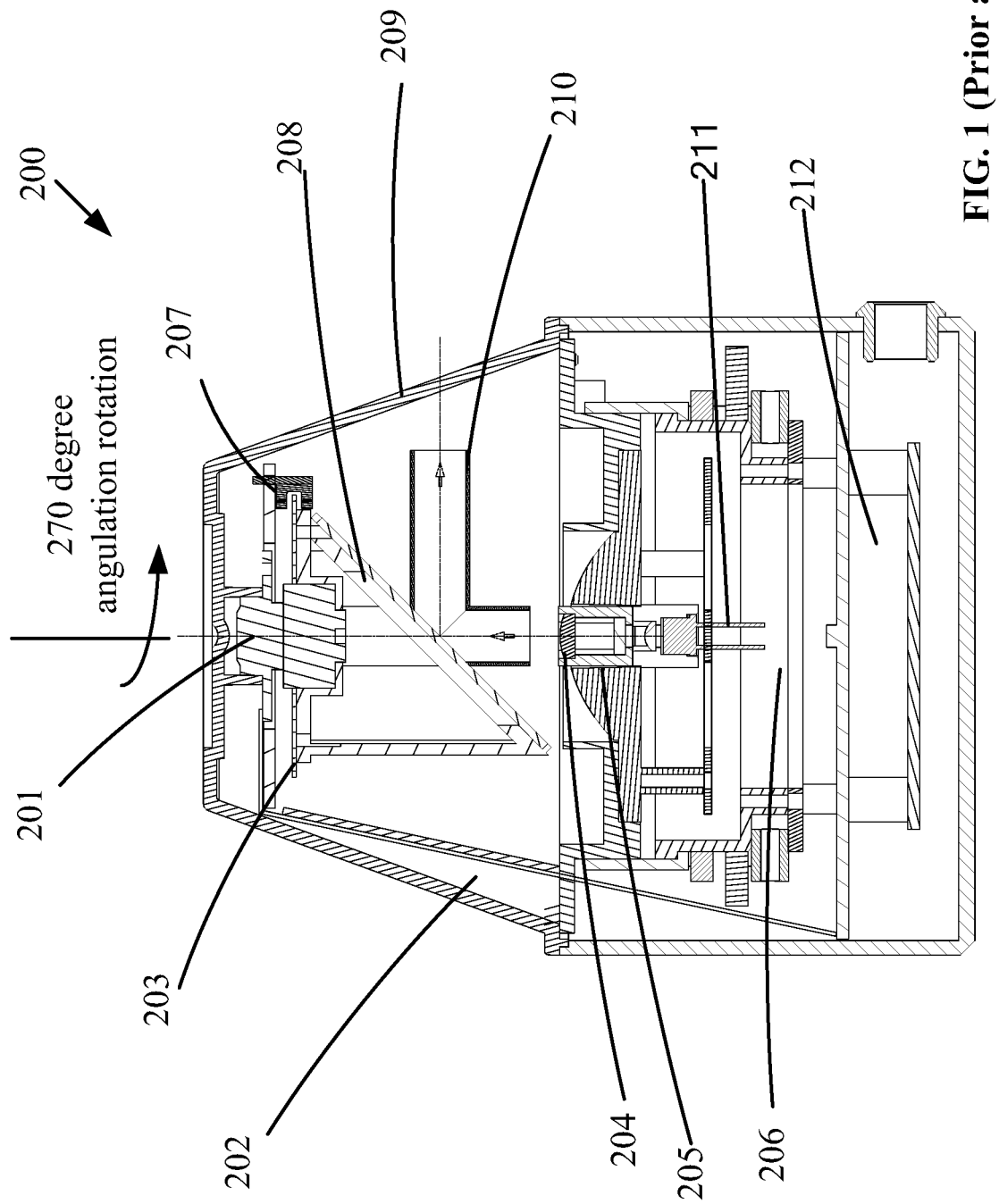
FIG. 1 is a schematic diagram of a LADAR device in the related art.
Figure 2:
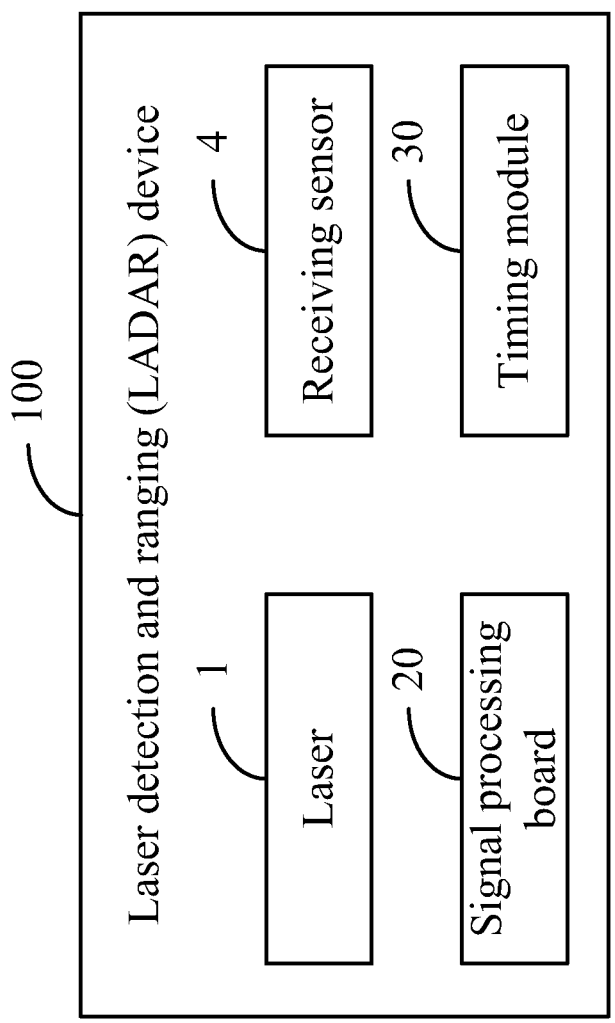
FIG. 2 is a structural block diagram of a LADAR device as described herein.
Figure 3:
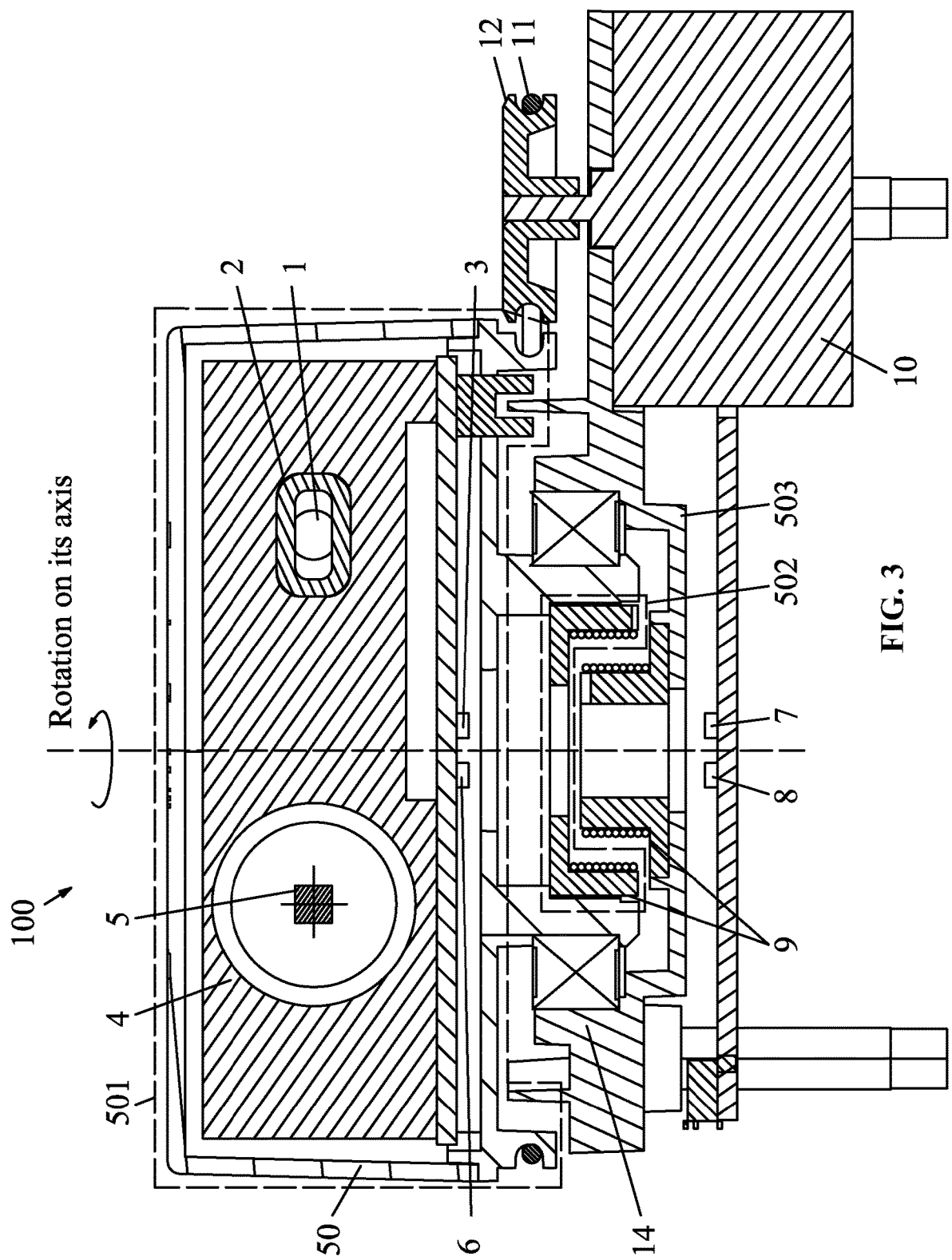
FIG. 3 is a schematic diagram of a LADAR device as described herein.

As shown in FIGS. 2-3, provided is a LADAR device 100 comprising a rangefinder; a signal transmission module; a power transmission module; a mechanical rotating part; and a housing. The signal transmission module comprises at least one optical communication transmitter and one optical communication receiver which are disposed in pairs. The power transmission module communicates with the signal transmission module through electromagnetic induction to achieve wireless power transmission. The mechanical rotating part is adapted to drive the rangefinder to rotate axially in 360 degrees. The wireless power transmission mode can simplify the layout of the cables, the power is transmitted and received through optical communication, so that no entanglement is produced, and the housing can rotate in 360 degrees separately.

As an improvement, the housing 50 of the LADAR device 100 comprises a first part 501 (an upper part), a second part 502 (a middle part), and a third part 503 (a lower part). The rangefinder is disposed in the upper part (the first part 501) of the housing, and comprises a laser 1, an emitting lens assembly 2, a receiving sensor 5 and a receiving lens 4.

The emitting lens assembly 2 comprises a first accommodation space and the laser 1 is disposed in the first accommodation space; the receiving lens 4 comprises a second accommodation space and the receiving sensor 5 is disposed in the second accommodation space. When in use, a laser light is generated by the laser 1, emitted from the emitting lens assembly, irradiates on a target object, reflected by the target object, received by the receiving lens 4, and enters the receiving sensor 5. As shown in FIG. 3, the signal transmission module comprises two optical communication transmitters and two optical communication receivers which correspond to each other, respectively, that is, a first optical communication transmitter 6 and a first optical communication receiver 7, and a second optical communication transmitter 8 and a second optical communication receiver 3. In the rotation of the housing, the optical signal can transmit from the first optical communication transmitter 6 to the first optical communication receiver 7, and/or transmit from the second optical communication transmitter 8 to the second optical communication receiver 3. The emitting lens assembly comprises at least one lens.

Specifically, the optical communication transmitter can be a light emitting diode (LED), and the optical communication receiver can be a receiving sensor.

The mechanical rotating part comprises a built-in hollow-shaft motor 10. The built-in hollow-shaft motor 10 is flexibly connected to the upper part (also the first part 501) of the housing 50 via a belt 11, and is adapted to drive the upper part and the middle part (the first part 501 and the second part 502) of the housing 50 to rotate via the belt 11. The rangefinder adapts to rotate axially to scan the surrounding environment in 360 degrees. The power transmission module comprises an upper part and a lower part adapting to transmitting power wirelessly through electromagnetic induction; the upper part is disposed in the middle part (the second part 502) of the housing 50 and adapts to rotate axially in 360 degrees; and the lower part of the power transmission module is fixed on the lower part (the third part 503) of the housing 50.

As shown in FIG. 3, both the upper part and the lower part of the power transmission module comprise magnet rings 9 encircling the windings of the cable. The magnet rings 9 are connected to one another rotatably. Optionally, the structures of the magnet rings 9 of the upper part and the lower part can be different, ensuring the noncontact of the magnet rings 9 of the upper part and the lower part. The power transmission is achieved through the coupled magnet rings 9, and the wireless transmission is an electromagnetic induction scheme commonly used for wireless charging of mobile phones.

Optionally, the rangefinder can be a laser rangefinder based on the principle of time of flight. For example, the rangefinder of the disclosure is a laser rangefinder based on the principle of time of flight. The laser 1 generates a modulated pulse laser signal. The signal is emitted via the emitting lens assembly 2. The laser light reflected from the target object is focused on the receiving sensor 5 by the receiving lens 4. The time-to-digital converter (TDC) acquires the time difference between transmitting and receiving optical signals, and then calculates the distance of the target object. TDC is a chip that calculates the flying time of light. In addition, chips such as Field Programmable Gate Array (FPGA) can be used to calculate the time difference. FIG. 3 shows that an external motor drives the rangefinder to rotate through a belt 11, thus achieving a 360-degree scanning detection of the surrounding environment. Optionally, a built-in hollow-shaft motor can be used to substitute for the external motor. The signal is transmitted through the full duplex optical communication mode. Optionally, the LADAR device further comprises a signal processing board 20 that generates a pulse signal, and a timing module 30. When in use, the timing module 30 adapts to receive the pulse signal of the signal processing board as a timing start signal, receive a timing termination signal from the receiving sensor 5, and calculate the time of flight of the laser light according to the timing start signal and the timing termination signal. The timing module 30 is also called timer.

In practice, the signal processing board 20 generates a pulse signal. The pulse signal is the timing start signal of the timing module. The pulse signal drives the laser 1 to emit a laser light. The laser light is irradiated to the outside through the transmitting lens assembly 2, and the returned light signal is received by the receiving lens 4 and focused on the receiving sensor 5 to yield an electrical signal. The electrical signal is the timing termination signal of the timing module. The timing module 30 acquires the time of flight of the laser, and the signal processing board 20 converts the time of flight into the distance data, and then in combination with the azimuth information acquired by the photoelectric switch, a set of LADAR data comprising azimuth information and distance information is obtained. During a period of transmission to reception, the azimuth and orientation of the receiving sensor 5 are unlimited, so as to receive reflected lights with sufficiently wide angles. The angles are determined by the rotation speed and rotation mode of the system.

Optionally, the signal transmission module comprises two optical communication transmitters and two optical communication receivers, and the two optical communication transmitters are corresponding to the two optical communication receivers, respectively. For example, in FIG. 3, provided are a first optical communication transmitter 6 and a first optical communication receiver 7, and a second optical communication transmitter 8 and a second optical communication receiver 3, to achieve full duplex communication mode or half-duplex communication mode. More optical communication transmitters and optical communication receivers can be disposed to achieve the duplex communication mode. Optionally, the optical signals of the paired optical communication transmitter and optical communication receiver are within the same waveband, and the optical signals of the unpaired optical communication transmitter and optical communication receiver are in different waveband. The technical solution can be replaced by half-duplex communication mode. The half-duplex communication mode can use two pairs of receivers of the same band.

Optionally, the signal transmission module can comprise one optical communication transmitter and one optical communication receiver corresponding to the one optical communication transmitter, to achieve the simplex communication. When the optical communication module only adopts a transceiver comprising one optical communication transmitter and one optical communication receiver to achieve the simplex communication, the measured data of the rangefinder needs to be sent only in a single direction. Optionally, when the signal transmission module comprises one optical communication transmitter and one optical communication receiver corresponding to the one optical communication transmitter, one of the optical communication transmitter and the optical communication receiver is disposed in the housing and the other is disposed outside of the housing. For example, the optical communication transmitter is disposed in the housing and the optical communication receiver is disposed outside of the housing. Thus, in the rotation of the housing, the optical signal transmitted by the optical communication transmitter can be received smoothly by the optical communication receiver.

The motor 1 of the LADAR device 100 is adapted to drive the upper part and the middle part (the first part 501 and the second part 502) of the housing 50 to rotate via the belt 11 and the driving wheel 12. The bearing 14 plays a supporting role. Optionally, the motor 1 is a built-in hollow shaft motor.

Optionally, the optical communication transmitters and the optical communication receivers are all diodes.

Figure 4:
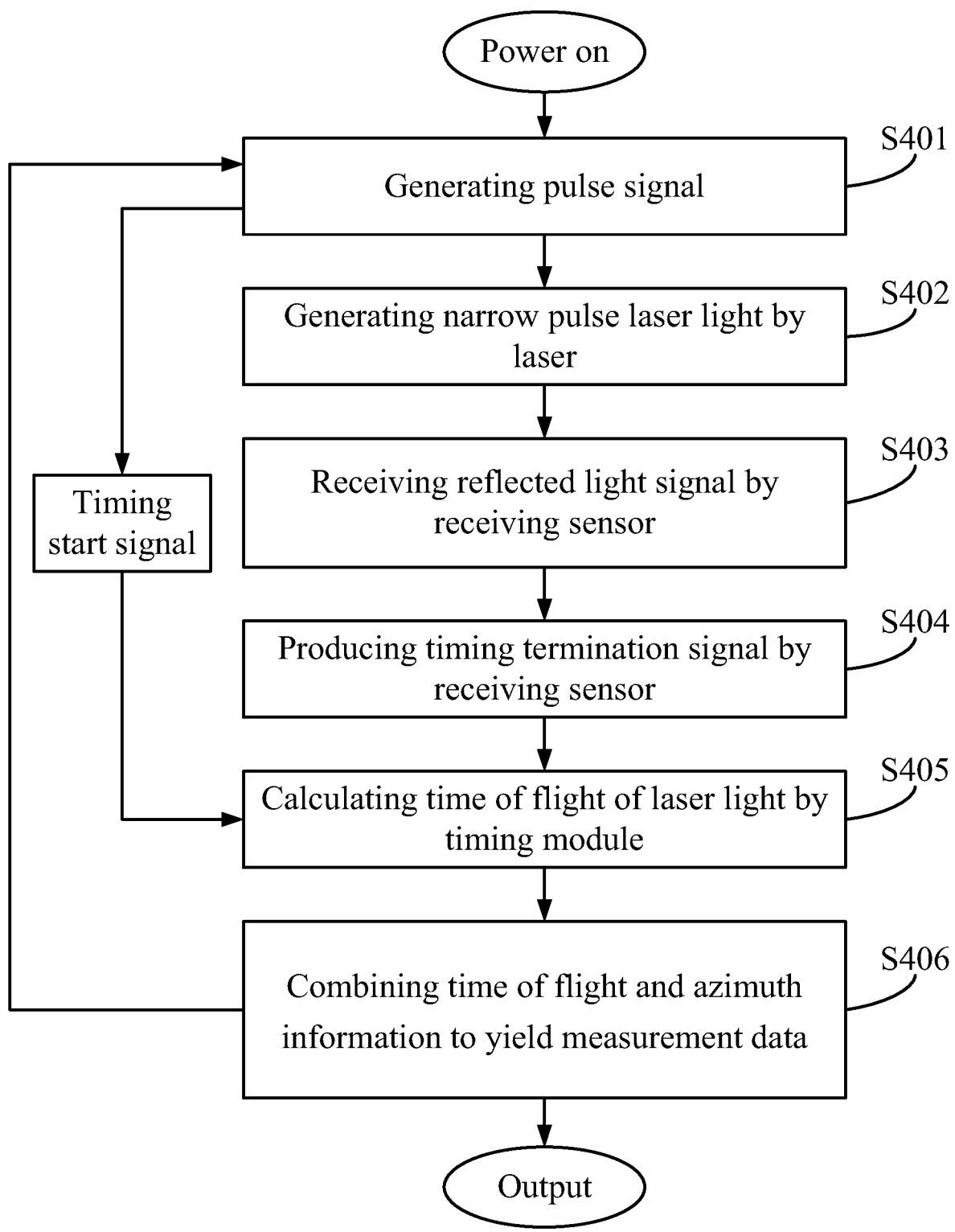
FIG. 4 is a workflow chart of a LADAR device as described herein.

FIG. 4 is a workflow chart of the LADAR device 100, which comprises:

S401: generating, by the signal processing board 20, a pulse signal;

S402: generating, by the laser 1, a narrow pulse laser light, which is also a timing start signal;

S403: receiving, by the receiving sensor, the reflected light signal; specifically, the laser light is reflected by the target object and enters the housing 50; the housing is in the form of a lens and focuses the reflected light on the receiving sensor 5;

S404: producing, by the receiving sensor, a timing termination signal, and transmitting the timing termination signal by the receiving sensor to the timing module;

S405: calculating, by the timing module, the time of flight of the laser light;

S406: combining the time of flight and azimuth information to yield measurement data. The data obtained is processed comprehensively and output.

Although some optional implementations are disclosed in the above embodiments, the relative positions of the laser and the receiving sensor can be changed, such as placing them horizontally, vertically, or in a certain angle.

The wireless power transmission in the disclosure can be replaced with other coupled modes. Compared with the related art that the scanning detection can only be carried out in about 270 degrees, the LADAR device of this embodiment can achieve 360-degree scanning. Compared with the related art that the conductive slip ring is used to transmit power and signals, the LADAR device of this embodiment contains no frictional conductive components and thus has a relatively long service life.

In summary, the LADAR device as descried in the disclosure comprises optimized optical components, contains no frictional conductive components, and thus has relatively high stability, reliability, and long service life, and can scan in 360 degrees.

It will be obvious to those skilled in the art that changes and modifications may be made, and therefore, the aim in the appended claims is to cover all such changes and modifications.

What is claimed is:

1. A LADAR device, comprising:
a rangefinder;
a signal transmission module;
a power transmission module;
a mechanical rotating part;
a housing;
a signal processing board; and
a timing module;
wherein:
the signal transmission module comprises at least one optical communication transmitter and one optical communication receiver corresponding to the one optical communication transmitter;
the power transmission module comprises coupled magnet rings, and communicates with the signal transmission module through electromagnetic induction to achieve wireless power transmission;
the mechanical rotating part is adapted to drive the rangefinder to rotate axially in 360 degrees;
the rangefinder is disposed on the housing, and comprises a laser, an emitting lens assembly, a receiving sensor, and a receiving lens; the emitting lens assembly comprises a first accommodation space and the laser is disposed in the first accommodation space; the receiving lens comprises a second accommodation space and the receiving sensor is disposed in the second accommodation space;
the at least one optical communication transmitter and one optical communication receiver corresponding to the one optical communication transmitter are disposed in a middle part of the housing;
the mechanical rotating part comprises a built-in hollow-shaft motor;
the housing comprises a first part, a second part, and a third part, and the second part is disposed between the first part and the third part;
the built-in hollow-shaft motor is flexibly connected to the first part of the housing via a belt, and is adapted to drive the first part and the second part of the housing to rotate via the belt;
the power transmission module comprises an upper part and a lower part;
the upper part is disposed in the second part of the housing and adapts to rotate axially in 360 degrees; and the lower part is fixed on the third part of the housing;
the rangefinder is a time-of-flight laser ranging module; and
when in use, the signal processing board adapts to produce a pulse signal; an optical signal is transmitted from the optical communication transmitter to the optical communication receiver; the timing module adapts to receive the pulse signal as a timing start signal, receive a timing termination signal from the receiving sensor, and calculate a time of flight of the optical signal according to the timing start signal and the timing termination signal.

2. The device of claim 1, wherein the signal transmission module comprises: a first optical communication transmitter and a first optical communication receiver corresponding to the first optical communication transmitter, and a second optical communication transmitter and a second optical communication receiver corresponding to the second optical communication transmitter, to achieve a full-duplex communication mode or a half-duplex communication mode.

3. The device of claim 2, wherein emitted optical signals of the first optical communication transmitter and received optical signals of the first optical communication receiver are in the same waveband; emitted optical signals of the second optical communication transmitter and received optical signals of the second optical communication receiver are in the same waveband; and emitted optical signals of the first/second optical communication transmitter and received optical signals of the second/first optical communication receiver are in different wavebands.

4. The device of claim 1, wherein the signal transmission module comprises one optical communication transmitter and one optical communication receiver corresponding to the one optical communication transmitter, to achieve a simplex communication mode.

5. The device of claim 1, wherein the optical communication transmitter and the optical communication receiver are diodes.

6. A method of using the LADAR device of claim 1, the method comprising:
   1) generating, by the signal processing board, a pulse signal;
   2) generating, by the laser, which is excited by the pulse signal, a pulse laser light, which is used as a timing start signal, and emitting, by the emitting lens assembly, the pulse laser light;
   3) receiving, by the receiving lens, a reflected laser light from a target object, and focusing, by the receiving lens, the reflected laser light on the receiving sensor;
   4) producing, by the receiving sensor, a timing termination signal, and transmitting the timing termination signal, by the receiving sensor, to the timing module;
   5) calculating, by the timing module, a time of flight of the laser light, and calculating distance data of the target object according to the time of flight of the laser light; and
   6) combining the distance data and azimuth information acquired by a photoelectric switch, to yield position information of the target object.

\* \* \* \* \*